July 17, 1928.
A. B. WERDEHOFF
1,677,574
TIRE CARRIER
Filed June 26, 1926
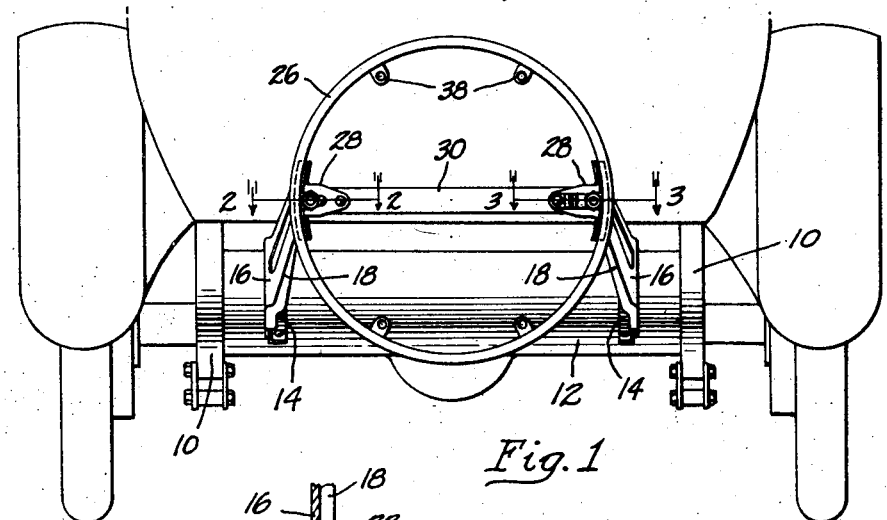
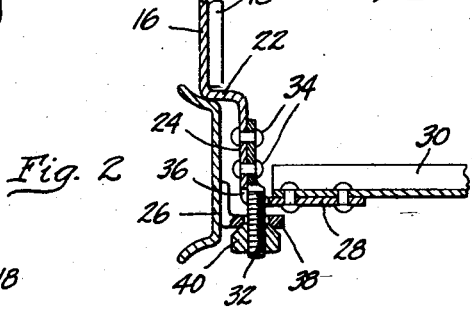
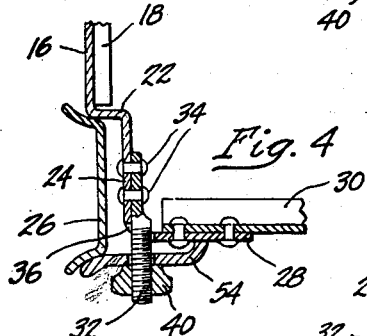
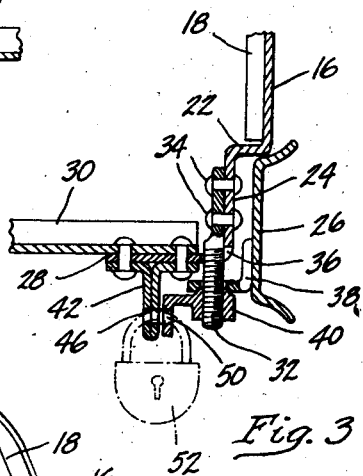
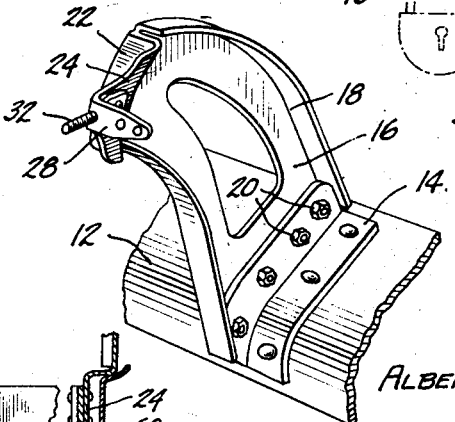
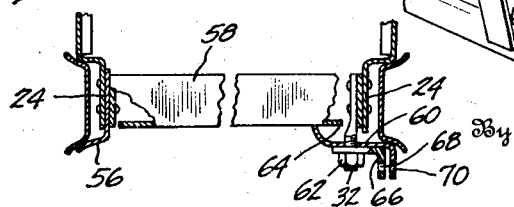
Inventor
ALBERT B. WERDEHOFF
By Hing Harness
Attorney Patented July 17, 1928.

1,677,574

UNITED STATES PATENT OFFICE.

ALBERT B. WERDEHOFF, OF BIRMINGHAM, MICHIGAN, ASSIGNOR TO CHRYSLER CORPORATION, OF DETROIT, MICHIGAN, A CORPORATION OF DELAWARE.

TIRE CARRIER.

Application filed June 26, 1926. Serial No. 118,836.

This invention relates to certain improvements in tire carriers and is designed particularly for use on automobiles, in connection with which the invention will be shown and described.

My invention has for its general object the provision of an inexpensive stamped construction in which a single pair of brackets are formed in such a manner that they form the tire rim support, thereby reducing the number of parts to a minimum.

Novel securing and locking means have been provided to secure the rim in position on the brackets and other objects of the invention will more fully appear from the following specification taken in connection with the accompanying drawings, in which:

Fig. 1 is a rear view of an automobile showing the carrier applied thereto.

Fig. 2 is a sectional view on line 2—2 of Fig. 1 showing the rim securing means.

Fig. 3 is a sectional view on line 3—3 of Fig. 1 showing the locking means.

Fig. 4 is a sectional view corresponding to Fig. 2 showing a modification.

Fig. 5 is a perspective of one of the brackets.

Fig. 6 is a sectional view showing a modification of the locking means.

I have shown an automobile having a frame 10 and a rear cross member 12. A pair of angle bars 14 have been shown attached to the rear cross member 12 adapted to support brackets 16. Each bracket is provided with a channel shaped portion 18, the lower end of which is attached to the angle bar 14 by bolts 20. The outer end of the channel portion is terminated and an inwardly depressed portion is formed by bending the metal at right angles to the channel shaped portion, thereby closing the outer end thereof as at 22 to form a rest for the tire rim. A portion 24 of the outer end is formed substantially parallel to the channel shaped portion and convexly curved to conform to the inner periphery of the tire rim. Thus a depressed portion is formed in the supporting bracket itself to receive a tire rim 26 and by such a formed bracket a rigid support is obtained light in weight and equal in strength to a much heavier and bulkier support.

A flange 28 is bent inwardly to which is attached a cross tie rod 30 of sufficient length to space the outer ends of the brackets to receive the tire rim and to rigidly connect the parts forming a unit readily assembled to an automobile. A screw threaded stud 32 is attached to the outer end of each bracket, preferably to the convex portion 24, by means of rivets 34 and projects through an opening 36 in the flange 28.

The tire rim 26 as shown in Figs. 1, 2 and 3 is provided with attached lugs 38, two of the opposite lugs are adapted to be received by the studs 32. Screw threaded members such as nuts 40 secure the rim in position and brace the same against the rest 22.

Adjacent one of the studs is an outwardly extending flange 42 shown secured to the bracket by means of the rivets 44 which also secure the cross tie 30. The flange 42 is provided with an opening 46 and the nut 40 is provided with an extension 48 also having an opening 50 adapted to register with the opening 46 to receive a lock 52 shown dotted.

As a modification of the construction, Fig. 4 shows a rim without the attached lugs. When it is desired to mount a rim of this type a lug 54 is adapted to secure the rim between the rest 22 and said lugs 54; the usual nuts and lock being used as where an attached lug is used.

As a further modification of the construction, Fig. 6 shows a rim without the attached lugs and one in which the rim is supported on the carrier at one side by an outwardly extending flange 56 which may be attached, as shown, or formed as an integral part of the convex portion 24. The opposite side of the support is shown with the stud 32 and cross tie 58 secured to the convex portion 24. A rim securing member 60, adapted to be received by the stud 32, has one end abutting against the cross tie forming a pivot for the opposite end to pinch the rim when the support is forced inwardly by the nut 62. Lateral flanges 64 prevent turning of the securing member 60. An outwardly extending flange 66 which may be integral with or separate from the nut 62, is provided with an opening 68 adapted to register with an opening 70 in the securing member 60 to receive a lock.

A tire carrier made in accordance with my invention has a minimum number of parts, formed of stampings and of such shape to give strength and rigidity. There are certain features herein disclosed which may not necessarily be limited to the construction shown and it is not my intention to limit this invention other than by the terms of the appended claims, as various changes may be made without departing from the spirit or scope of my invention.

What I claim is:

1. A tire carrier of the class described comprising a pair of brackets secured to the rear cross member of an automobile frame and each comprising a one piece element having a channel shaped portion, an inwardly offset portion at the termination of said channel shaped portion to receive one edge of a tire rim, and arc shaped portion at right angles to said offset portion conforming to the inner periphery of the tire rim, an outer end portion bent inwardly and at right angles to said arc shaped portion adapted to receive a cross tie connecting said brackets, and means for securing a tire rim in position on said brackets.

2. A tire carrier of the class described comprising a pair of stamped brackets each comprising a single element having a channel shaped portion, an inwardly extending portion adapted to close one end of said channel portion, a convex portion at right angles to said inwardly extending portion, and means carried by said convex portion for securing a tire rim in position on said brackets.

ALBERT B. WERDEHOFF.